(12) United States Patent
Yang et al.

(10) Patent No.: US 7,799,850 B2
(45) Date of Patent: *Sep. 21, 2010

(54) EPOXY COMPOSITE MATERIAL CONTAINING POLYANILINE/CARBON BLACK AND PREPARATION METHOD THEREOF

(75) Inventors: Cheng-Chien Yang, Longtan Township, Taoyuan County (TW); Kuo-Hui Wu, Taoyuan (TW); Wang Tsae Gu, Longtan Township, Taoyuan County (TW); Yuen-Hsin Peng, Longtan Township, Taoyuan County (TW)

(73) Assignee: Chung Shan Institute of Science and Technology, Armaments Bureau, M.N.D., Taoyuan County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/289,551

(22) Filed: Oct. 30, 2008

(65) Prior Publication Data

US 2009/0109791 A1 Apr. 30, 2009

Related U.S. Application Data

(62) Division of application No. 11/976,939, filed on Oct. 30, 2007.

(51) Int. Cl.
*C08K 3/04* (2006.01)
*H01B 1/24* (2006.01)
*H01B 1/04* (2006.01)

(52) U.S. Cl. .............. 523/215; 523/334; 524/495; 252/502; 252/510

(58) Field of Classification Search .......... 428/403; 523/201, 215, 334; 252/502, 510, 511; 106/472; 427/113; 524/495

See application file for complete search history.

(56) References Cited

U.S. PATENT DOCUMENTS

| 5,093,407 | A | * | 3/1992 | Komai et al. ............ 524/495 |
| 5,498,372 | A | * | 3/1996 | Hedges ................... 252/511 |
| 5,665,212 | A | * | 9/1997 | Zhong et al. ............ 429/105 |
| 6,743,379 | B2 | * | 6/2004 | Gottschling et al. ..... 252/511 |
| 2006/0182945 | A1 | * | 8/2006 | Yoneyama et al. ...... 428/304.4 |

OTHER PUBLICATIONS

Luo et al. Synthesis and Characterization of core-shell nanocomposites of polyaniline and carbon black. Synthetic metals. Jun. 12, 2005, pp. 293-296.*

* cited by examiner

*Primary Examiner*—Vasu Jagannathan
*Assistant Examiner*—Hannah Pak
(74) *Attorney, Agent, or Firm*—Rosenberg, Klein & Lee

(57) ABSTRACT

An epoxy composite material containing polyaniline/carbon black and preparation method thereof are disclosed. The epoxy composite material containing polyaniline/carbon black includes a plurality of polyaniline/carbon black composite with core-shell structure distributed in epoxy resin while polyaniline covers on surface of nanoscale carbon black to form the polyaniline/carbon black composite with core-shell structure. The polyaniline/carbon black composite with core-shell structure contains 10~30 wt. % of nanoscale carbon black. A method for preparing an epoxy composite material containing polyaniline/carbon black includes steps of: adding a plurality of polyaniline/carbon black composites with core-shell structure into epoxy resin; and dispersing the plurality of polyaniline/carbon black composites with core-shell structure in the epoxy resin to produce the epoxy composite material containing polyaniline/carbon black being applied to conductive coating or microwave absorbing elements.

7 Claims, 12 Drawing Sheets

EPOXY COMPOSITE MATERIAL CONTAINING POLYANILINE/CARBON BLACK AND PREPARATION METHOD THEREOF

RELATED APPLICATIONS

This application is a Divisional patent application of co-pending application Ser. No. 11/976,939, filed on 30 Oct. 2007. The entire disclosure of the prior application Ser. No. 11/976,939, from which an oath or declaration is supplied, is considered a part of the disclosure of the accompanying Divisional application and is hereby incorporated by reference.

BACKGROUND OF THE INVENTION

The present invention relates to a polyaniline/carbon black composite material and a preparation method thereof, especially to an epoxy composite material containing polyaniline/carbon black and a preparation method thereof that are applied to various fields such as conductive coating or microwave absorbing material.

The research and development of conductive coatings have been over a half-century. Working as conductive layer, electromagnetic wave shielding layer and antistatic coating, the conductive coatings have broad perspective and increasing market demands. The membrane surface of the conductive coating has higher resistance, charge generated thereon is not dissipated effectively so that static charges tend to accumulate thereon. This leads to certain limitations on applications of some respects such as dust proofing and bacteria resistance in medicine, protection from electric shock in medical operations, static protection for preventing static ignition and explosion in mine environment and petrochemistry, dust-proofing for protection of integrated circuit, and fiber accumulation in spinning industry. The conductive coating is special coating or meeting various requirements. The conductive coating is coating with conductor and semiconductor properties and the conductivity is above $10^{-10}$ S/cm, being applied to various fields such as electronic and electric appliance industry, printed circuit board, switches, marine antifouling coatings, electrothermal material, and electromagnetic wave shielding, and surface protection.

While using carbon series as filler in preparation of conductive coating, carbon black (mainly high conductive furnace carbon black and acetylene carbon black), graphite and carbon fiber are mixed together. In literatures, graphite as conductive filler is added with epoxy resin and it is found that the conductivity is dramatically improved when amount of the graphite is over 50 wt. %. However, addition of graphite results in poor physical and mechanical properties and poor processability. This leads to limits on usefulness of the conductive coating.

The conductive and microwave absorbing polyaniline has features of light weight, good plasticity, easy raw materials acquisition, easy synthesis and high stability. Thus an epoxy composite material containing conductive and microwave absorbing polyaniline, and high conductive and microwave absorbing nanoscale carbon black is produced so as to overcome defects of poor physical property, poor mechanical property and poor processability caused by large amount of graphite being added. Moreover, the present invention has features of high conductivity and high microwave absorption without adding large amount of carbon black. Thus weight of carbon black added in conductive coating or microwave absorbing material is dramatically reduced so as to facilitate the applications of material in conductive elements or microwave absorbing elements.

SUMMARY OF THE INVENTION

Therefore it is a primary object of the present invention to provide an epoxy composite material containing polyaniline/carbon black and a preparation method thereof that achieve high conductivity and microwave absorption effect without addition of large amount of carbon black.

It is another object of the present invention to provide an epoxy composite material containing polyaniline/carbon black and a preparation method thereof that overcome shortcomings of conductive coatings caused by large amount of graphite being added such as reduced physical property, poor mechanical property and poor processability.

It is a further object of the present invention to provide an epoxy composite material containing polyaniline/carbon black and a preparation method thereof that dramatically reduce amount of conventional conductive coating or microwave absorbing material being used so as to facilitate the applications in conductive elements or microwave absorbing elements.

In order to achieve objects, the present invention provides an epoxy composite material containing polyaniline/carbon black and preparation method thereof. The epoxy composite material containing polyaniline/carbon black includes a plurality of polyaniline/carbon black composite with core-shell structure distributed in epoxy resin while polyaniline covers on surface of nanoscale carbon black to form the polyaniline/carbon black composite with core-shell structure. The polyaniline/carbon black composite with core-shell structure contains 10~30 wt. % of nanoscale carbon black. A method for preparing an epoxy composite material containing polyaniline/carbon black includes steps of: adding a plurality of polyaniline/carbon black composites with core-shell structure into epoxy resin; and dispersing the plurality of polyaniline/carbon black composites with core-shell structure in the epoxy resin to produce the epoxy composite material containing polyaniline/carbon black.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

An epoxy composite material containing polyaniline/carbon black according to the present invention includes a plurality of polyaniline/carbon black composite with core-shell structure distributed in epoxy resin while polyaniline covers on surface of nanoscale carbon black to form the polyaniline/carbon black composite with core-shell structure. The polyaniline/carbon black composite with core-shell structure contains 10~30 wt. % of nanoscale carbon black.

The particle diameter of the nanoscale carbon black particle is 10~80 nm and the particle diameter of the polyaniline/carbon black core-shell particle ranges from 50 to 250 nm (from observation of transmission electron microscopy (TEM)). The preferable weight percent of nanoscale carbon black in the polyaniline/carbon black core-shell particle is 20 wt. %. The weight ratio of the polyaniline/carbon black composite with core-shell structure to the epoxy resin ranges from 2:8 to 4:6 and the optimum weight ratio is 3:7. The plurality of polyaniline/carbon black core-shell particles are distributed evenly in the epoxy resin.

Figure 1:
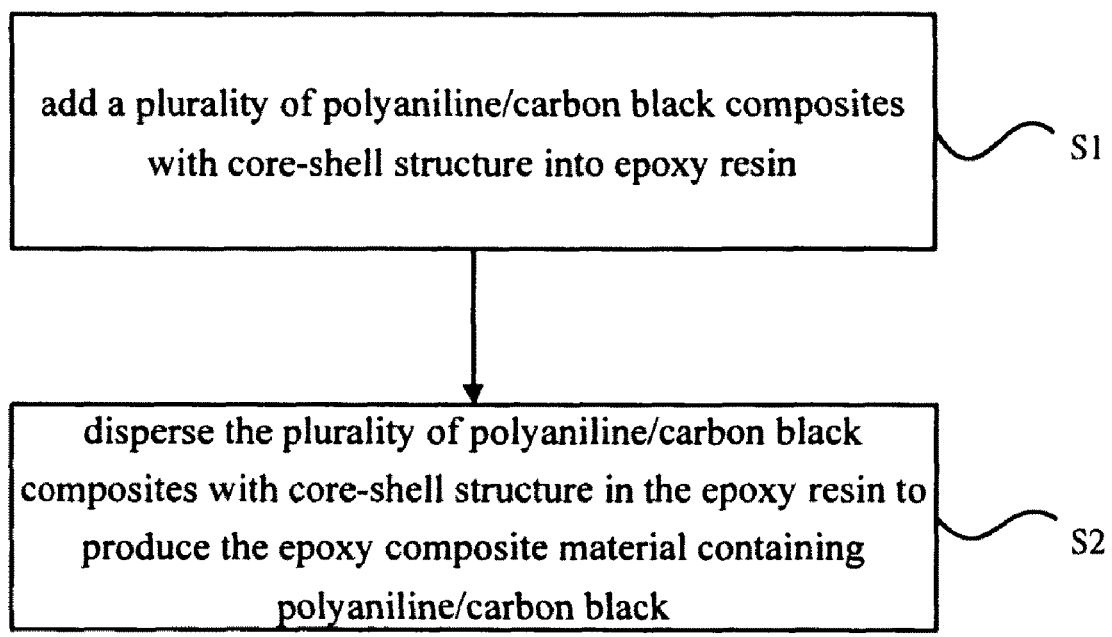
FIG. 1 is a flow char showing steps of preparing an epoxy composite material containing polyaniline/carbon black according to the present invention.

Refer to FIG. 1, a method for preparing an epoxy composite material containing polyaniline/carbon black includes following steps:

S1 add a plurality of polyaniline/carbon black composites with core-shell structure into epoxy resin; and S2 disperse the plurality of polyaniline/carbon black composites with core-shell structure in the epoxy resin to produce the epoxy composite material containing polyaniline/carbon black.

In the step S2, it further includes a step to use a DC (direct current)-stirrer for dispersing the plurality of polyaniline/carbon black composites with core-shell structure evenly in the epoxy resin. The steps S2 further includes a step of hot pressing. The step S1 further includes a step of adding aniline into nanoscale carbon black solution and then adding ammonium persulfate and acid into the mixture to produce the polyaniline/carbon black composites with core-shell structure. The nanoscale carbon black solution is produced by adding nanoscale carbon black into a dispersing agent and ethanol solution, then further adding acid into the mixture solution and processing the mixture by ultrasound vibration. In the step of adding aniline into nanoscale carbon black solution and then adding ammonium persulfate and acid into the mixture to produce the polyaniline/carbon black composites with core-shell structure, steps of vacuum filtration and acid rinsing are further included. After steps of vacuum filtration and acid rinsing, a step of being heated for drying and grinded is further included.

Preparation Method of Polyaniline/Carbon Black (PANI/CB) Composite with Core-Shell Structure (1) Add carbon black (CB; Degussa PHG-1P) into a dispersing agent (US, GE QF-DT-7100S) and 50 ml ethanol solution, then add 100 ml HCl (hydrogen chloride) (2M) into the mixture solution; after ultrasound vibration for an hour, nanoscale carbon black solution is produced.

(2) Before being used, aniline is purified by second distillation and then the purified aniline is added into above mixture solution. Keep solution temperature at 0 to 5 Celsius degrees and stir the solution for an hour.

(3) Dissolve ammonium persulfate into 25 ml HCl (2M) and slowly drop the mixture into the mixture solution in step (2) and stir the solution well for 2 hours.

(4) After vacuum filtration, use HCl (2M) acid rinsing at room temperature. Then a sample is produced after vacuum filtration. After being heated for drying and grinded, powder of PANI/CB composite with core-shell structure is obtained.

Embodiment of a Preparation Method of Epoxy Composite Material Containing Polyaniline/Carbon Black (1) Add 15 g powder of PANI/CB composite with core-shell structure and epoxy rein into a beaker and stir the mixture well by a DC-stirrer.

(2) Pour the mixture of step (1) into a steel mold with length, width and thickness of 15 cm, 15 cm and 0.2 cm while top and bottom sides of the steel mold are clipped by steel plates.

(3) Being hot pressed by a heat compression molding machine under pressure of 35 kg·F/cm$^2$ at 80□ for 2 hours, a microwave absorbing piece made from epoxy nanocomposite material containing polyaniline/carbon black is produced.

Fourier Transform Infrared (FT-IR) Analysis

Figure 2:
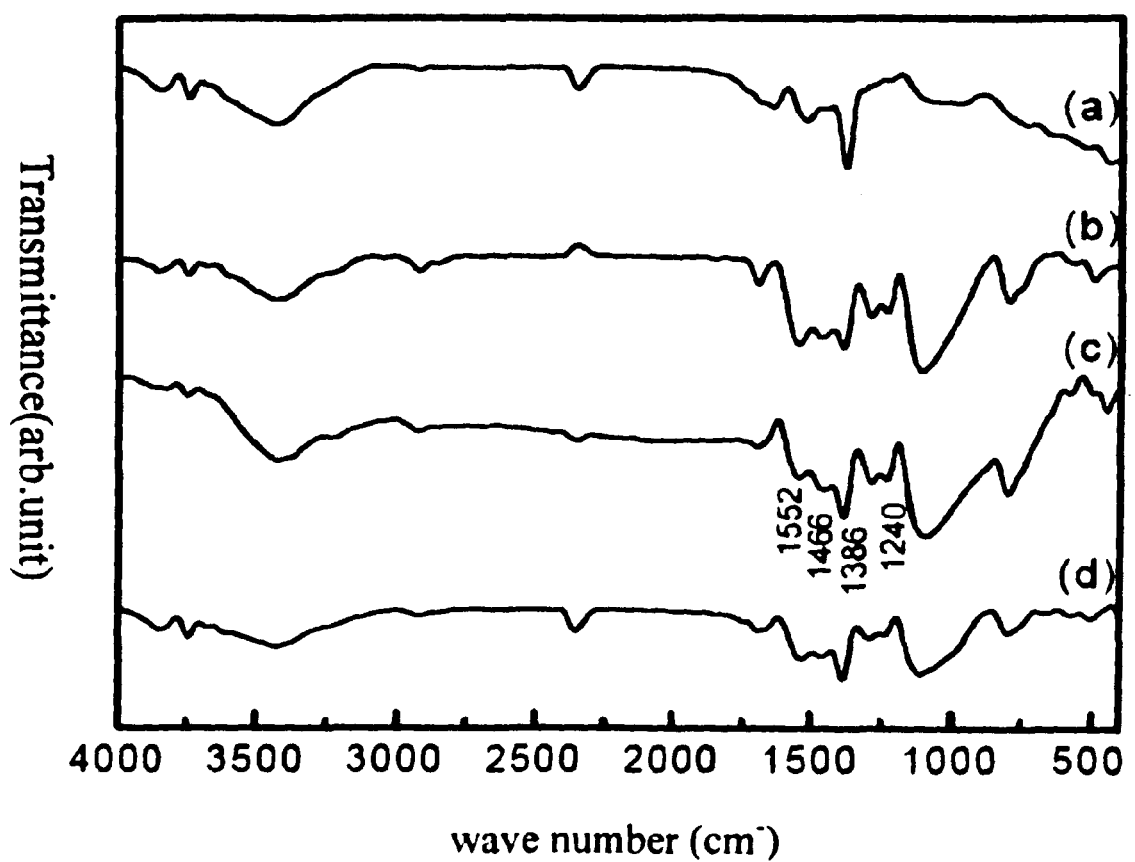
FIG. 2 is infrared spectra of polyaniline/carbon black composite material containing different weight ratio of carbon black according to the present invention.

By means of Fourier Transform Infrared Spectrophotometer, it is proved that polyaniline is distributed in conductive carbon black. Refer to FIG. 2, (a) represents a spectral curve of polyaniline, (b) represents a curve of PANI/CB(10)-nanoscale carbon black is 10% of total weight of polyaniline/carbon black, (c) represents a curve of PANI/CB(20) which means nanoscale carbon black is 20% of total weight of polyaniline/carbon black, and (d) represents a curve of PANI/CB(30) which means nanoscale carbon black is 30% of total weight of polyaniline/carbon black. Refer to curve (a), there is a vibration absorption peak of N-H of polyaniline at 3460 cm$^{-1}$ while two absorption peaks near 1552 and 1466 cm$^{-1}$ are respectively of quinoid ring (Q) and benzenoid ring (B) of polyaniline. The C-N stretching vibration peaks at 1386 and 1240 cm$^{-1}$ are of a Q-B-Q unit and a B-B-B unit. From to intensity of absorption peak increases along with delocalized degrees and conductivity of the main chain. Thus absorption peak between 950-1110 cm$^{-1}$ is considered as characteristic peak in determining whether polyaniline is with conductivity or not and is called "electronic like band". From curve (b) to curve (d) in FIG. 2, above characteristic peak is observed. Thus it is proved that polyaniline exists in conductive carbon black.

UV-Vis Spectra Analysis

Figure 3:
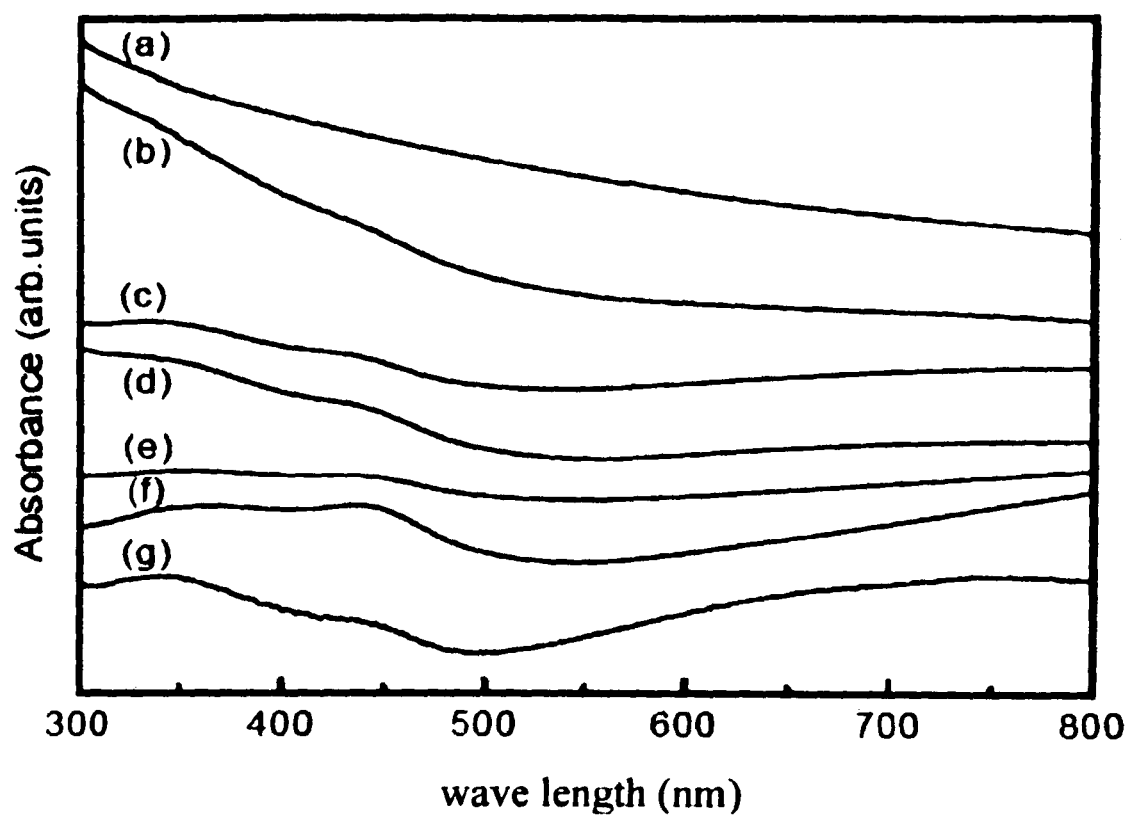
FIG. 3 is UV-Vis spectra of PANI/CB composite with various weight of carbon black according to the present invention.

Add PANI/CB composite into deionized water and apply ultrasonic vibration by a ultrasonic vibration device for 10 minutes to make composites disperse inside the deionized water. Then measure the solution by UV-Vis Spectrophotometer. Refer to FIG. 3, UV-Vis spectra of PANI/CB composite with various weight of carbon black is disclosed. Curve (a) is spectrum of nanoscale carbon black, curve (b) is spectrum of PANI/CB(30), curve (c) is spectrum of PANI/CB(20), curve (d) is spectrum of PANI/CB(15), curve (e) is spectrum of PANI/CB(10), curve (f) is spectrum of PANI/CB(5), and curve (g) is spectrum of PANI. It is observed in FIG. 3 that there is no absorption peak of carbon black between 300~800 nm. This is resulted from no conjugate electron pair of carbon black. While in liquid-phase UV-visible spectroscopy, there are three absorption peaks for PANI/CB core-shell composite. One peak at about 350 nm is absorption peak of $\pi$-$\pi$* transition of benzenoid ring. The second shoulder-like peak is about at 450 nm and absorption after 600 nm keeps extending towards higher wavelength. Such absorption is caused by transition of cation-radical and polaron-bipolaron of main chain of polyaniline. That means quinoid ring (Q) and benzenoid ring (B) of polyaniline being doped by protic acid (such as HCl) so that electron ionization occurs and further results in conjugation between quinoid ring (Q) and benzenoid ring (B). Thus electrons have high mobility. This means PANI/CB composite is in the form of emeraldine salt which is a conducting (electron transfer) form. Furthermore, absorption peak near 450 nm shifts to lower wavelength area along with increasing amount of carbon black being added. This means oxidized unit of the composite increases along with the increasing amount of carbon black being added. This may be due to electron transfer force generated between the carbon black and the segments of polyaniline. This can also explain why conductivity of 7 PANI/CB composite increases. Moreover, carbon black itself has no absorption in UV-visible spectroscopy. Thus along with increasing amount of carbon black being added, absorption peaks of PANI/CB composite near 350 nm and 450 nm are getting weaker. However, the characteristic absorption peaks still exist and this means polyaniline is electrically conductive emeraldine salt form.

X-Ray Diffraction Analysis

Figure 4:
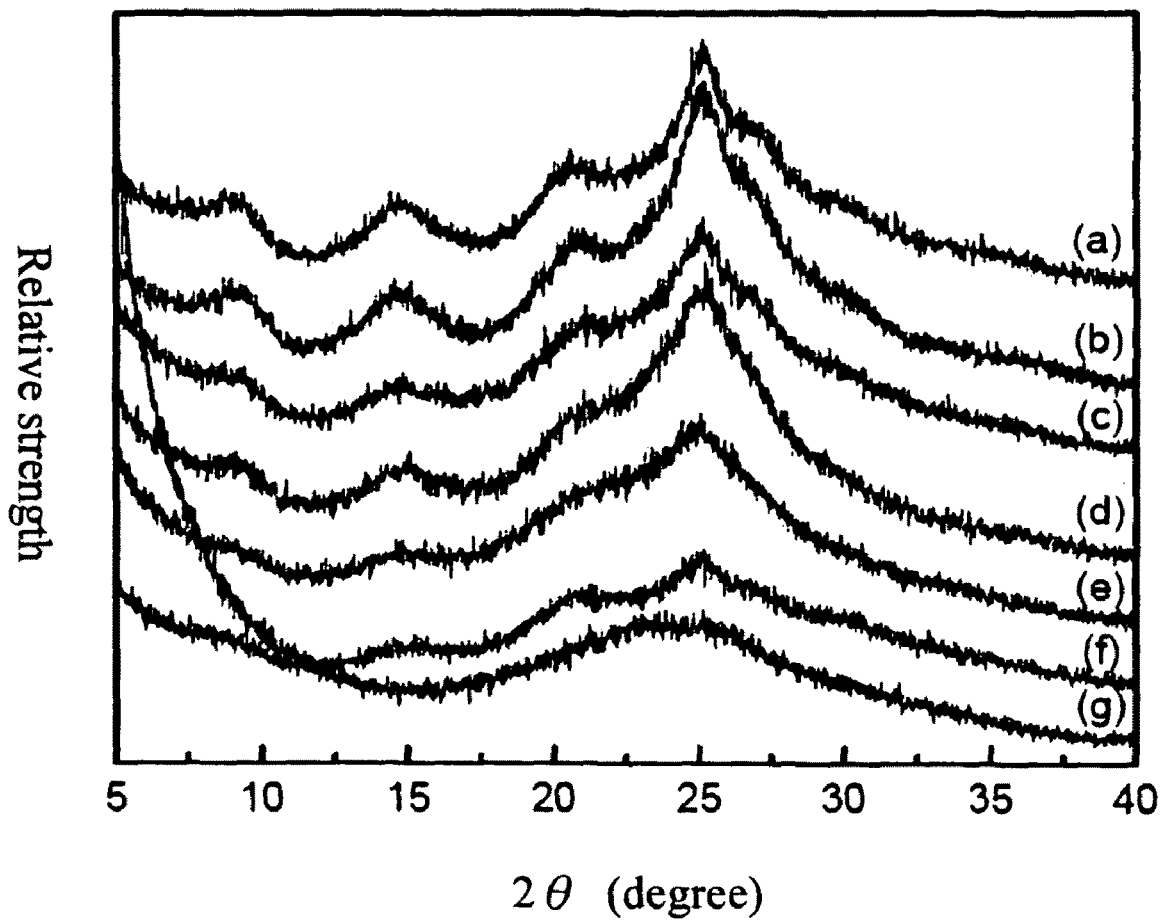
FIG. 4 is XRD (X-ray Diffraction) pattern of polyaniline/carbon black composite with various weight of carbon black according to the present invention.

Refer to FIG. 4, it shows XRD (X-ray Diffraction) pattern of polyaniline/carbon black composite with various weight of carbon black. Curve (a) is pattern of polyaniline (PANI), curve (b) is spectrum of PANI/CB(5), curve (c) is spectrum of PANI/CB(10), curve (d) is spectrum of PANI/CB(15), curve (e) is spectrum of PANI/CB(20), curve (f) is spectrum of PANI/CB(30), and curve (g) is spectrum of carbon black (CB). As to the curve of carbon black, a broad absorption peak appears at $2\theta=24.3°$ and this means carbon black is in amorphous structure. This can be compared with TEM (transmission electron microscopy) figure of carbon black described later. Moreover, absorption peaks of PANI/CB occur at $2\theta=10°$, $15°$, $21°$, $25°$, so does the pattern of the curve of aniline. These are all characteristic absorption peaks of aniline. It will be seen from this that addition of carbon black doesn't not change crystal form of aniline. Yet along with increasing ratio of carbon black in aniline, each absorption peak of aniline becomes weaker and this means the amount of carbon black is over maximum amount of carbon black that aniline covers. Conversely, aniline is covered by carbon black. Similar result is shown by a SEM figure of PANI/CB described later. Once absorption peak of PANI/CB composite at $2\theta=25°$ is higher than the peak at $2\theta=21°$, it is highly doped and is conducting emeraldine salt form.

Electron Paramagnetic Resonance (EPR) and Conductivity Analysis

Figure 5:
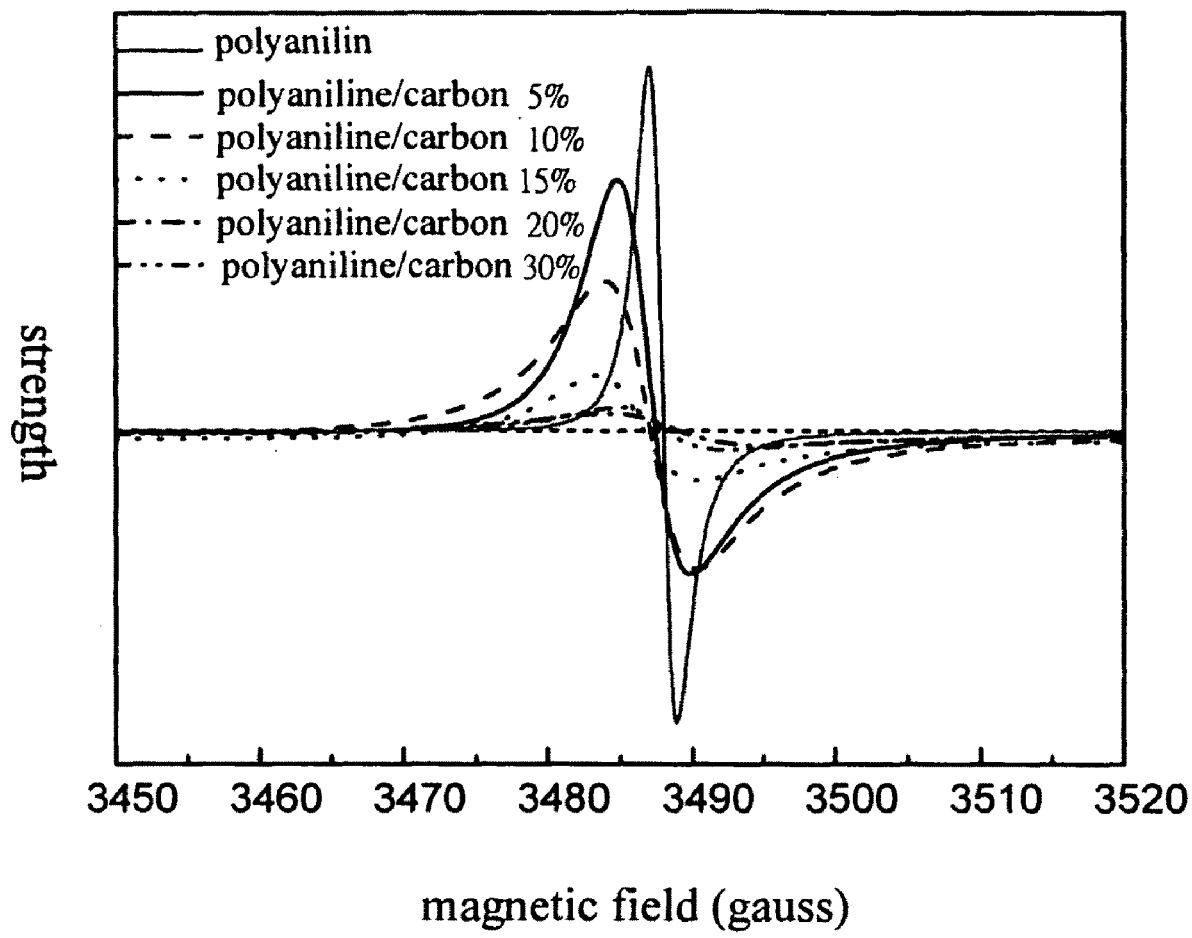
FIG. 5 is EPR spectroscopy of polyaniline/carbon black composite with various amount of carbon black according to the present invention.

By means of electron paramagnetic resonance, free electron in aniline and interaction between aniline and carbon black are discussed. Refer to FIG. 5, it is EPR spectroscopy of polyaniline/carbon black composite with various amount of carbon black. All data in spectra is analyzed by Lorentzian function-a distribution function. The line width ($\Delta H_{pp}$), values of g factor, values of spin concentration, and spin-spin relaxation times ($T_2$) are shown in list 1. Because carbon black has no free electron so that there is no absorption in EPR spectroscopy while other PANI/CB composite has similar pattern to EPR spectra of PANI.

By an equation (1), value of g factor of each sample is calculated and listed in list 1.

$$g = g_s - (\Delta H/H_0) g_s \qquad (1)$$

wherein $g_s$ is g value of reference material-DPPHm $\Delta H$ is difference of spectrum half-width (full width half height) between reference material and sample to be measured.

The g value of six carbons on pure aniline is about 2.0031 and the g value of one nitrogen is about 2.0054. Thus the arithmetic average of g value is about 2.0054. The g value of PANI/CB composite ranges from 2.0043 to 2.0050. That means free electrons of polyaniline in the composite are nearer to N—H bond and polyaniline in the composite is between Emeraldine salt form and Emeraldine base form. Along with increasing amount of carbon black being added, g value tends to increase. This means free electrons of polyaniline are localized near area around N—H bond by carbon black while this will not affect conductivity of composites. Refer to values of conductivity of PANI/CB composite in list 2, the higher ratio the carbon black is, the higher conductivity the PANI/CB composite has. This may be due to bridging effect of carbon black that compensates reduced conducting ability caused by transformation of polyaniline.

List 1: EPR parameters of PANI/CB composite at room temperature

| sample | $\Delta H_{pp}(G)$ | g value | $N_s$(Spins/g) | $T_2$(sec) |
| --- | --- | --- | --- | --- |
| PANI | 1.073 | 2.0044 | $4.01 \times 10^7$ | $3.05 \times 10^{-8}$ |
| PANI/CB(5) | 5.164 | 2.0046 | $3.78 \times 10^9$ | $6.34 \times 10^{-9}$ |
| PANI/CB(10) | 6.336 | 2.0043 | $1.68 \times 10^{10}$ | $5.17 \times 10^{-9}$ |
| PANI/CB(15) | 6.922 | 2.0046 | $3.78 \times 10^{10}$ | $4.73 \times 10^{-9}$ |
| PANI/CB(20) | 7.508 | 2.0047 | $7.70 \times 10^{11}$ | $4.36 \times 10^{-9}$ |
| PANI/CB(30) | 10.988 | 2.0050 | $1.36 \times 10^{12}$ | $2.98 \times 10^{-9}$ |

Peak-to-Peak Linewidth, $\Delta H_{pp}$

As to solid samples, the following factors may have effect on the half-width thereof: (1) movement narrowing and fine splitting (2) interaction between unpaired electrons (including various types of transporting, fixing and movement) (3) exchange narrowing. It is learned from list 1 that Linewidth of each composite at room temperature is larger (5.164→10.988 G) along with increasing amount of carbon black being added (PANI/CB(5)→PANI/CB(30)). And it's larger than line width of aniline (1.073 G). This means an interactive force exists between polyaniline and carbon black. Linewidth variance is under influence of interactions between electron spinning and surroundings, spinning motion or structural rearrangement of copolymer. Thus the linewidth of PANI/CB(30) is maximum due to large interaction between polyaniline and carbon black. This indirectly indicates that polyaniline and carbon black are doped with each other evenly so that interactive force is proportional to the amount of carbon black being added.

Spin Concentration; $N_s$

Area under EPR spectrum is about equal to $(\Delta H_{pp})^2 \times h$ while h is height. Under the same conditions, use DPPH as reference material, number of unpaired spin electrons in the system is learned from area size. Refer to the list 1, electron spin concentration ($N_s$) of each composite from largest to smallest is PANI/CB(30)>PANI/CB(20)>PANI/CB(15)>PANI/CB(10)>PANI/CB(5)>PANI. Spin concentration of PANI/CB(30) is largest and this means this sample has more spin electrons than others and it is expected that PANI/CB(30) should have highest conductivity. Moreover, spin electrons of PANI is only 1/34000 of spin electrons of PANI/CB(30). It follows that addition of carbon black is helpful to generating spin electrons of polyaniline. The amount of carbon black being added is also related to the number of spin electrons generated. Along with increasing ratio of carbon black, spin concentration also increases and it is expected conductivity also becomes higher.

Spin-Spin Relaxation Time; $T_2$

A spin relaxation process is that an electron turns from high-energy state to low-energy state by electron transfer induction of similar electrons while a spin-spin relaxation is caused by energy difference between excited electron and electrons nearby and the spin-spin relaxation time ($T_2$) is determined by linewidth in accordance with equation (2):

$$\frac{1}{T_2} = \frac{g\beta\Delta H_{1/2}}{\eta}, \Delta H_{1/2} = \sqrt{3}\, \Delta H_{pp} \quad (2)$$

wherein β is Bohr magneton ($9.274 \times 10^{-21}$ erg gauss$^{-1}$), $\Delta H_{1/2}$ is Full Width Half Height of absorption peak (gauss), and η is a constant ($1.054 \times 10^{-27}$ ergs).

Through the list 1, it is found that $T_2$ value of different PANI/CB composites with various amount of carbon black reduces from $6.34 \times 10^{-9}$ sec to $2.98 \times 10^{-9}$ sec (PANI/CB(5)→PANI/CB(30)) while PANI itself has highest T value ($3.05 \times 10^{-8}$ s). $T_2$ value is affected by different electronic environment. Due to different ratio of PANI/CB, various electronic environments are available. Therefore, it is indicated that spin-spin relaxation time is inversely proportional to linewidth and is reduced along with increasing of carbon black.

Conductivity

Polyaniline is a (quasi-one-dimensional conductive polymer. After protonation, poluaniline turns from insulating states into conducting states. In the present invention, polyaniline is doped with protonic acid such as hydrochloric acid so as to produce polyaniline in emeraldine salt form. The emeraldine salt of polyaniline is polymerized in the presence of carbon black to produce conductive composite material. Measure resistance of the composite material and calculate conductivity by an equation (3).

$$\sigma = (1/R) \times (h/A) \quad (3)$$

wherein conductivity has the unit of siemens per centimeter S/cm, R is resistance (Ω), h and A are respectively thickness (cm) and area (cm$^2$) of a test piece.

Refer to list 2, it is found that conductivity of composites from largest to smallest is: CB>PANI/CB(30)>PANI/CB(20)>PANI/CB(15)>PANI/CB(10)>PANI/CB(5)>PANI. This is consistent with electron spin concentration ($N_s$). It follows that the larger the electron spin concentration is, the higher the conductivity is. Along with increasing ratio of carbon black, bridging effect is increased so that conductivity of composite is getting higher.

| List 2 Values of conductivity of PANI/CB at room temperature | |
|---|---|
| sample | value of conductivity(S/cm) |
| PANI | 0.19969 |
| CB | 1.22301 |
| PANI/CB(5) | 0.20569 |
| PANI/CB(10) | 0.33878 |
| PANI/CB(15) | 0.47329 |
| PANI/CB(20) | 0.63226 |
| PANI/CB(30) | 0.84523 |

Figure 6:
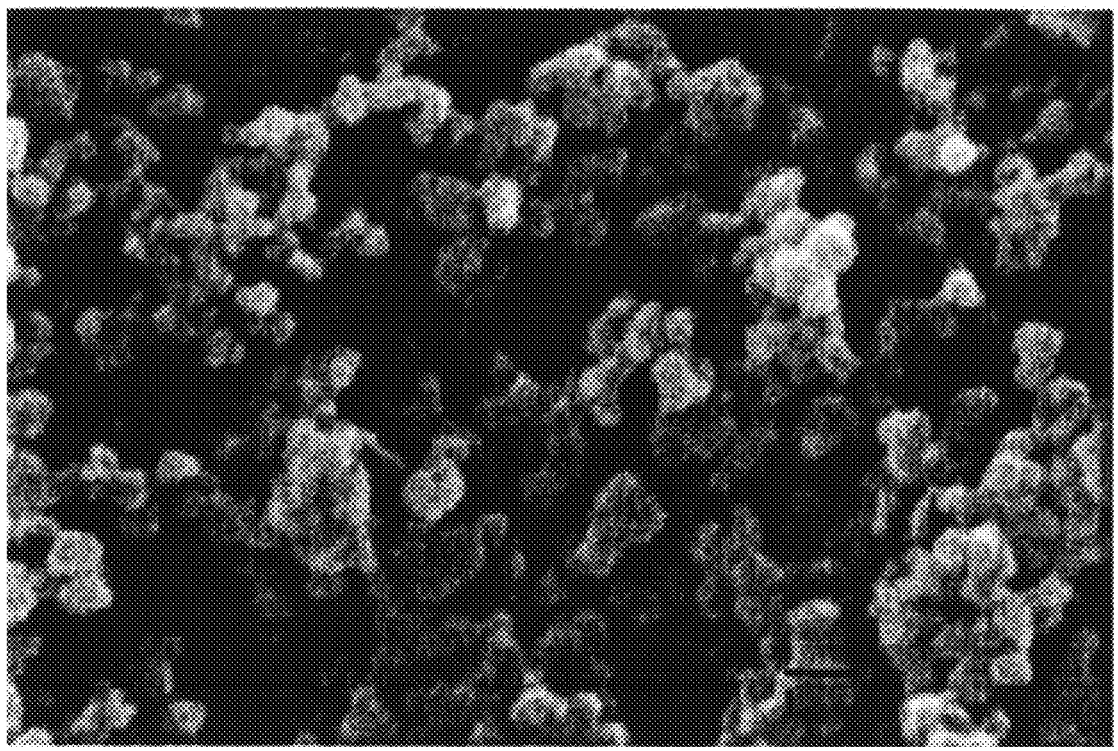
FIG. 6 is a scanning electron microscope (SEM) image of nanoscale carbon black (CB) according to the present invention.
Figure 7A:
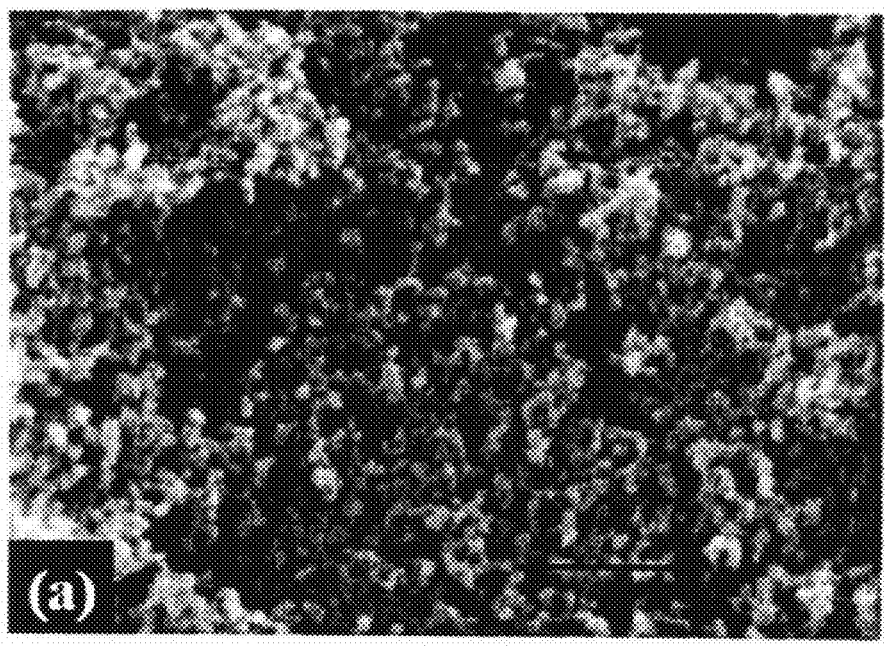
FIG. 7A is another SEM image of nanoscale carbon black (CB) according to the present invention.
Figure 7B:
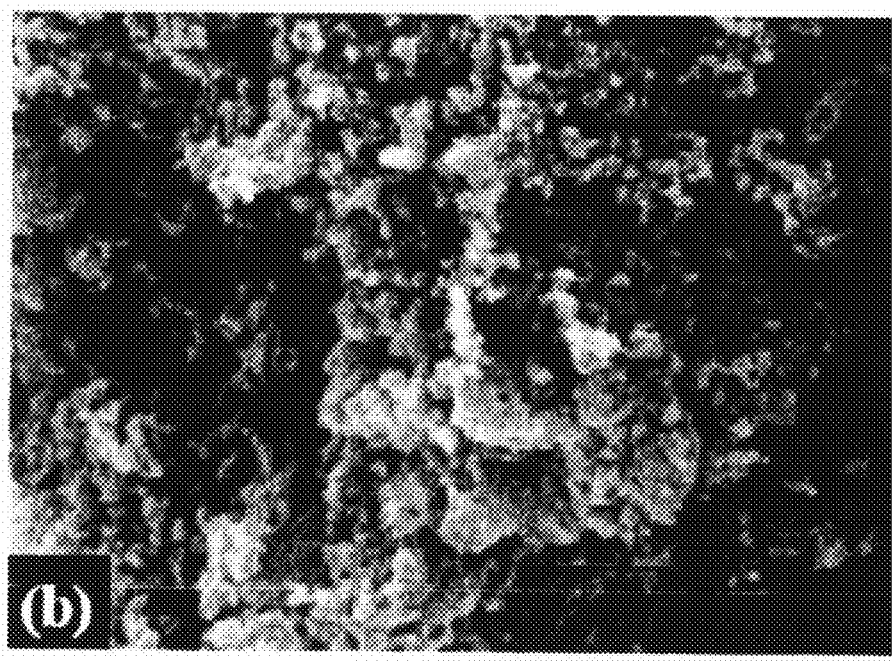
FIG. 7B is a SEM image of PANI/CB(30) according to the present invention.
Figure 7C:
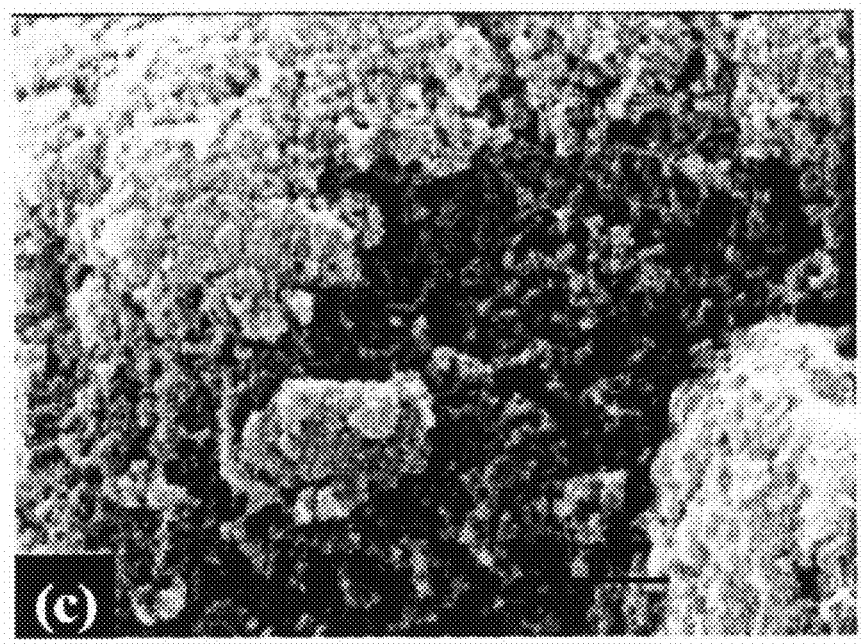
FIG. 7C is a SEM image of PANI/CB(20) according to the present invention.
Figure 7D:
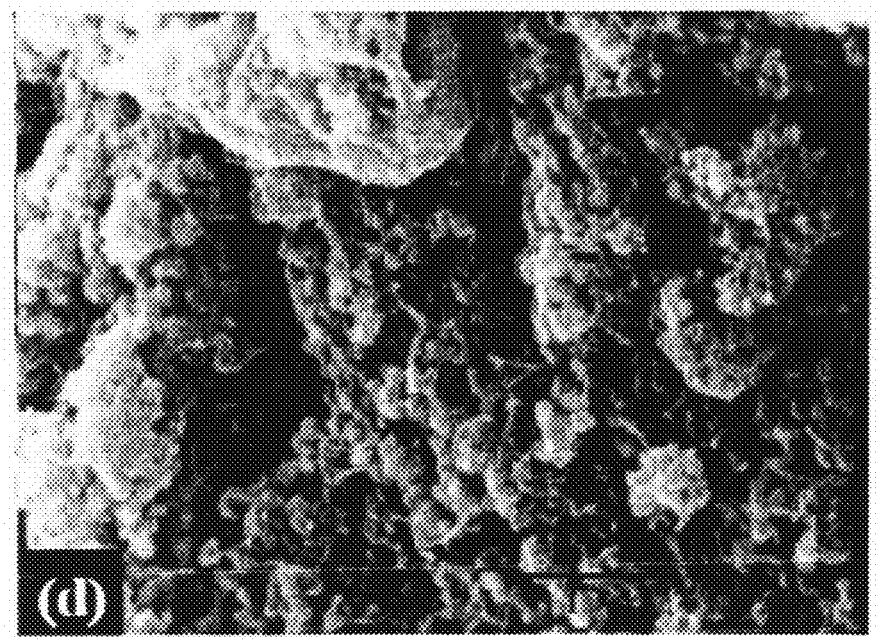
FIG. 7D is a SEM image of PANI/CB(10) according to the present invention.

Scanning Electron Microscope (SEM) and Transmission Electron Microscope (TEM) Analysis Refer to FIG. 6, it is a scanning electron microscope (SEM) image of carbon black and average diameter of its particle is from 10 to 80 nm. Although there are some clusters formed by aggregation of part of particles, it is proved that the carbon black is in nanoscale. Refer from FIG. 7A to FIG. 7D, respectively are SEM images of CB, PANI/CB(30), PANI/CB(20) and PANI/CB(10). The length of scale on bottom of each figure is 1 μm. In FIG. 7D, it is found that polyaniline covers the carbon black evenly. Yet along with increasing amount of carbon black being added, carbon black exposed outside polyaniline is getting more, as shown in FIG. 7B. Thus it is supposed that after addition of 20% of carbon black, there is over-saturation. From FIG. 7A to FIG. 7D, threadlike polyaniline is observed. This may be caused by connection of conductive channels and further a conductive network is formed. This leads to higher conductivity of composites.

Figure 8A:
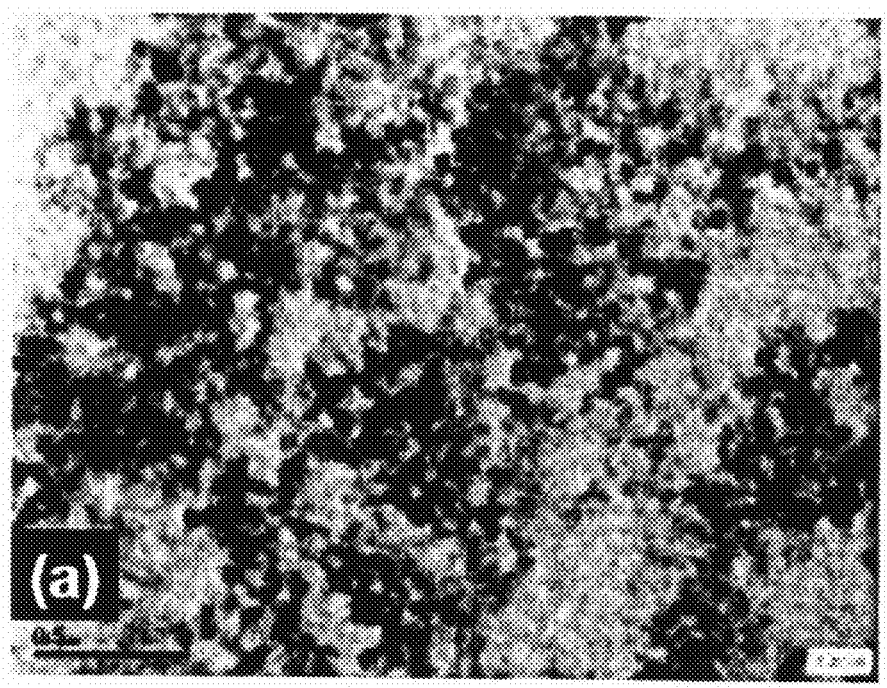
FIG. 8A is a TEM figure of CB according to the present invention.
Figure 8B:
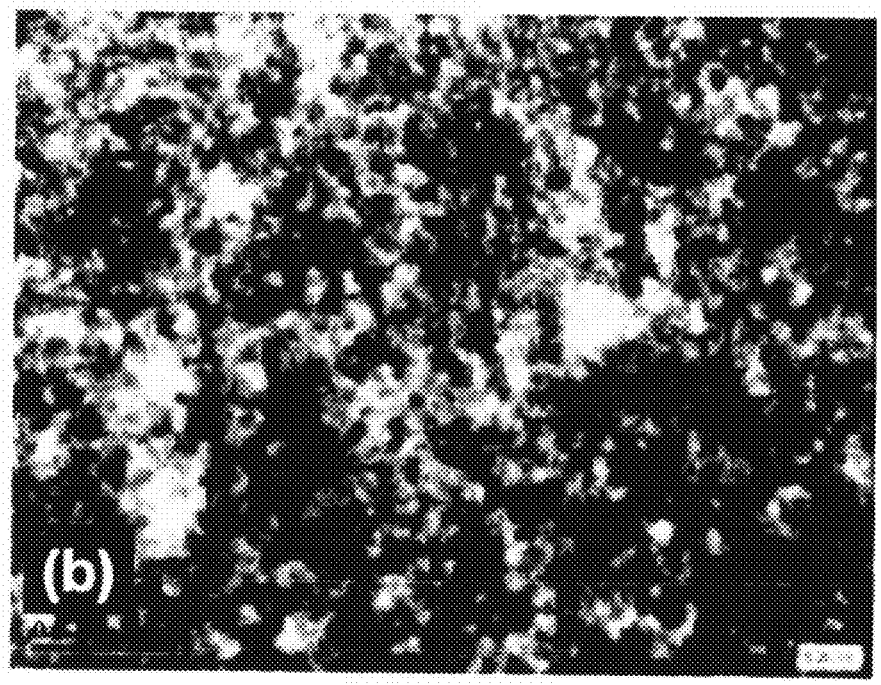
FIG. 8B is a TEM image of PANI/CB(30) according to the present invention.
Figure 8C:
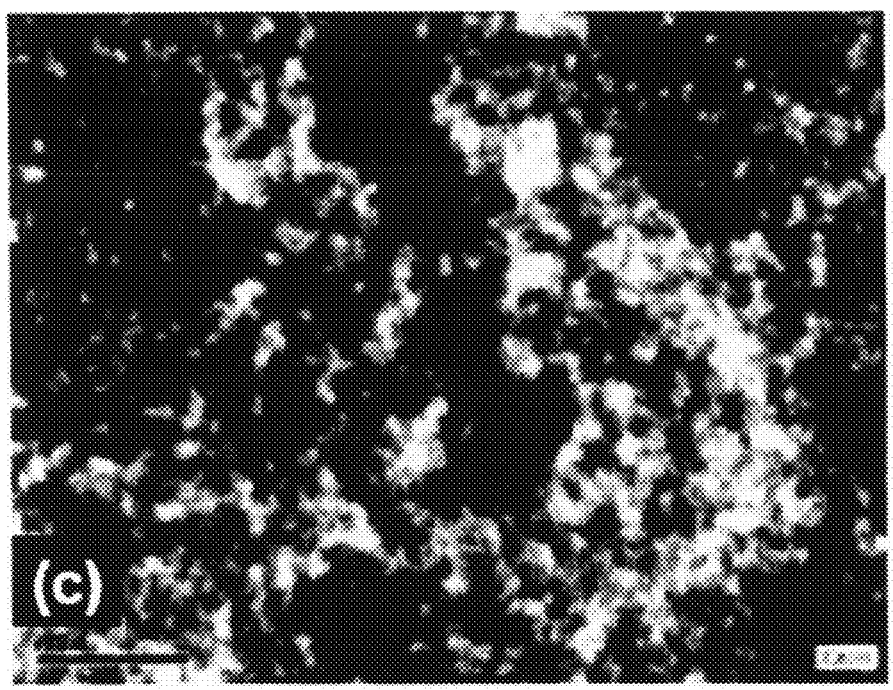
FIG. 8C is a TEM image of PANI/CB(20) according to the present invention.
Figure 8D:
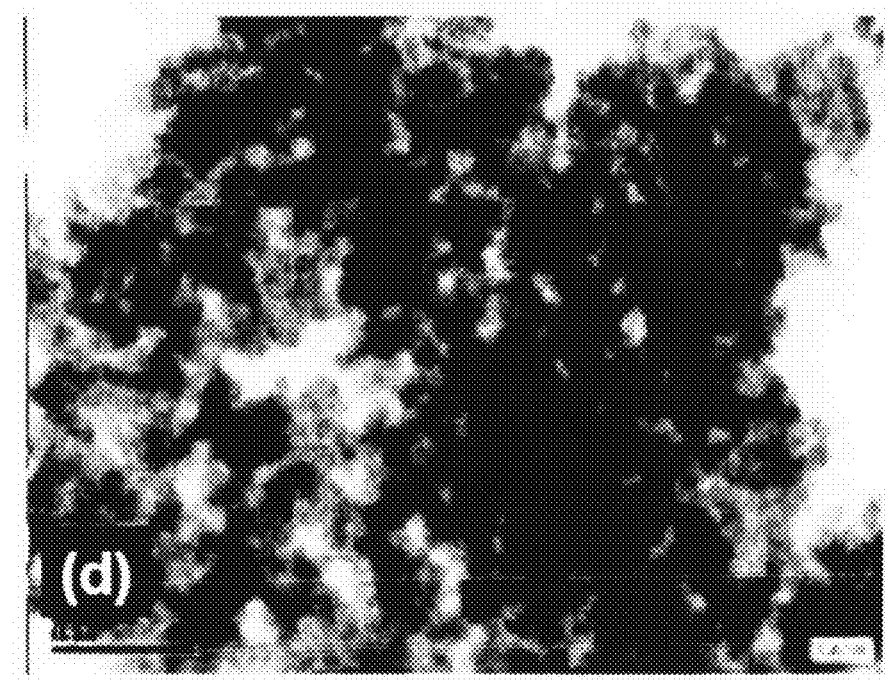
FIG. 8D is a TEM image of PANI/CB(10) according to the present invention.

Refer from FIG. 8A to FIG. 8D, respectively are TEM figures of CB, PANI/CB(30), PANI/CB(20) and PANI/CB (10). The length of scale on bottom of each figure is 0.5 μm. It is observed that either distribution of carbon black or covering of polyaniline is quite ideal and there is no mass. Thus an evenly conductive network is formed so that conductivity of the composite is increased. In FIG. 8D, the darker area is carbon black while the lighter area is polyaniline. This figure shows that the polyaniline covers the carbon black. Yet from FIG. 8A to FIG. 8C, along with increasing amount of carbon black being added, carbon black distributed outside polyaniline is getting more. This result can be compared with SEM images in FIG. 7A to FIG. 7C. Therefore, observe the microstructure, structure and distribution of PANI/CB(20) are most perfect and it has adequate conductivity without decreasing mechanical property and processability.

Microwave Absorbing Property Analysis of PANI/CB

Figure 9:
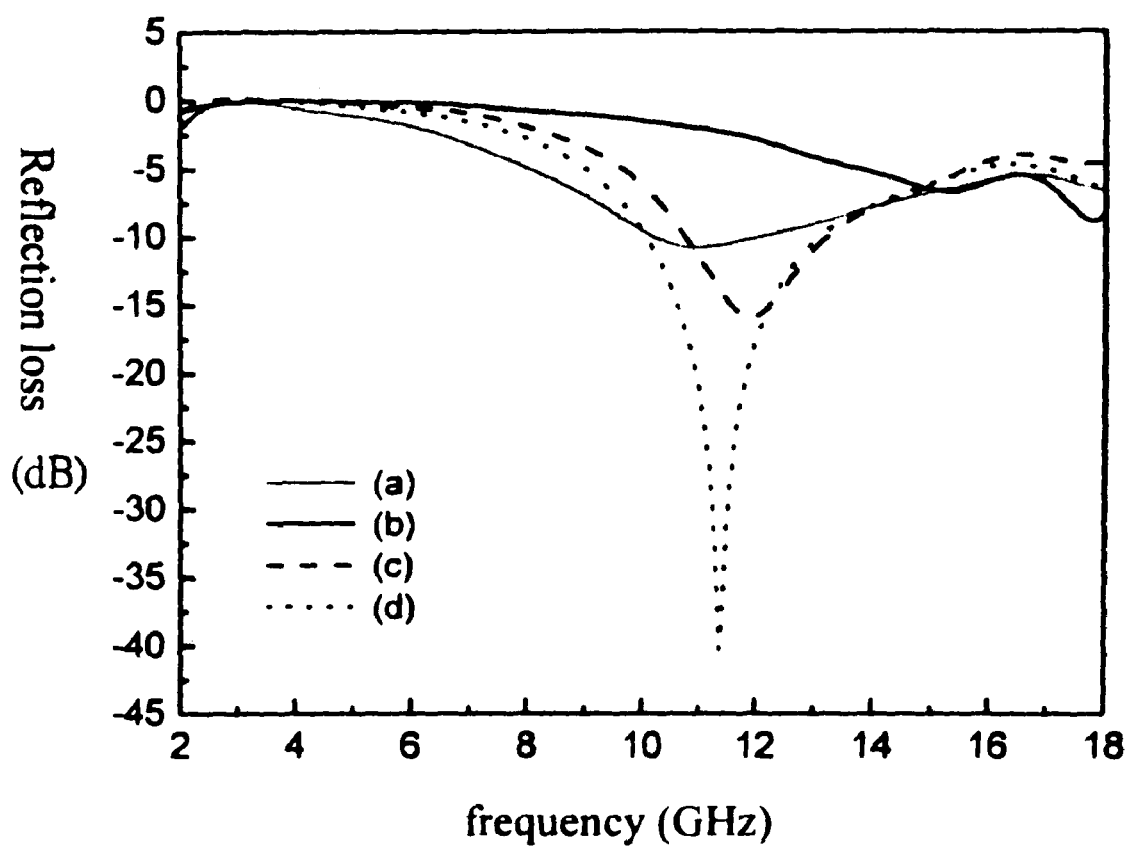
FIG. 9 is return loss of carbon black/epoxy nanocomposite material and epoxy composite material containing polyaniline/carbon black with various weight of carbon black with frequency from 2 to 18 GHz.

Add powder of CB, PANI/CB(10), PANI/CB(20) and PANI/CB(30) composite into epoxy resin in weight ratio of 3/7 and the mixture is made into 15 cm×15 cm test pieces with thickness of 0.2 cm for performing microwave absorbing tests with frequency ranging 2-18 GHz and 18-40 GHz. Refer to FIG. 9, return loss of nanocomposite material with frequency from 2 to 18 GHz is disclosed, curve (a) is epoxy/CB nanocomposite material, curve (b) is epoxy/PANI/CB(10) nanocomposite material, curve (c) is epoxy/PANI/CB(20) nanocomposite material, and curve (d) is epoxy/PANI/CB(30)

nanocomposite material. The values of relative dB and the peak are in list 3. The return loss of epoxy/PANI/CB(30) nanocomposite material is −40 dB and the peak is at 11.4 GHz while when dB is −10, the linewidth is about 3.1 GHz (10-13.1 GHz). The return loss of epoxy/PANI/CB(20) nanocomposite material is −16 dB and the peak is at 12 GHz while when dB is −10, the linewidth is about 2.5 GHz (10.7-13.2 GHz). The peak of epoxy/PANI/CB(10) nanocomposite material is at 15 GHz and the return loss is −6.8 while the peak of epoxy/CB is at 11 GHz and the return loss is −10. It is found from above curves that epoxy/PANI/CB(30) and epoxy/PANI/CB(20) nanocomposite materials achieve over 90% absorption of low frequency radar wave. The possible reason that the two nanocomposite material has better absorption effect of low frequency radar wave than pure epoxy/carbon black nanocomposite material is due to electromagnetic effect generated by surface polarization between polyaniline and carbon black. The absorption effect of epoxy/PANI/CB (10) nanocomposite material is not as good as the above two nanocomposite materials. The results show that with frequency ranging from 2 to 18 GHz, the epoxy/PANI/CB(30) nanocomposite material has best absorption effect and it is supposed that this is due to more amount of carbon black in the test piece. Thus it follows that when there is more amount of carbon black in the composite material, the absorption effect thereof at low frequency is more obvious.

List 3 microwave absorption parameters at low frequency of epoxy composite material containing polyaniline/carbon black

|  | Epoxy nanocomposite material containing CB | Epoxy nanocomposite material containing PANI/CB(10) | Epoxy nanocomposite material containing PANI/CB(20) | Epoxy nanocomposite material containing PANI/CB(30) |
|---|---|---|---|---|
| peak frequency | 11.0 GHz | 15.2 GHz | 11.9 GHz | 11.4 GHz |
| maximum return loss | 10.9 dB | 6.8 dB | 16 dB | 40 dB |
| dB = −10 linewidth | none | none | 10.7~13.2 GHz | 10~13.1 GHz |

Figure 10:
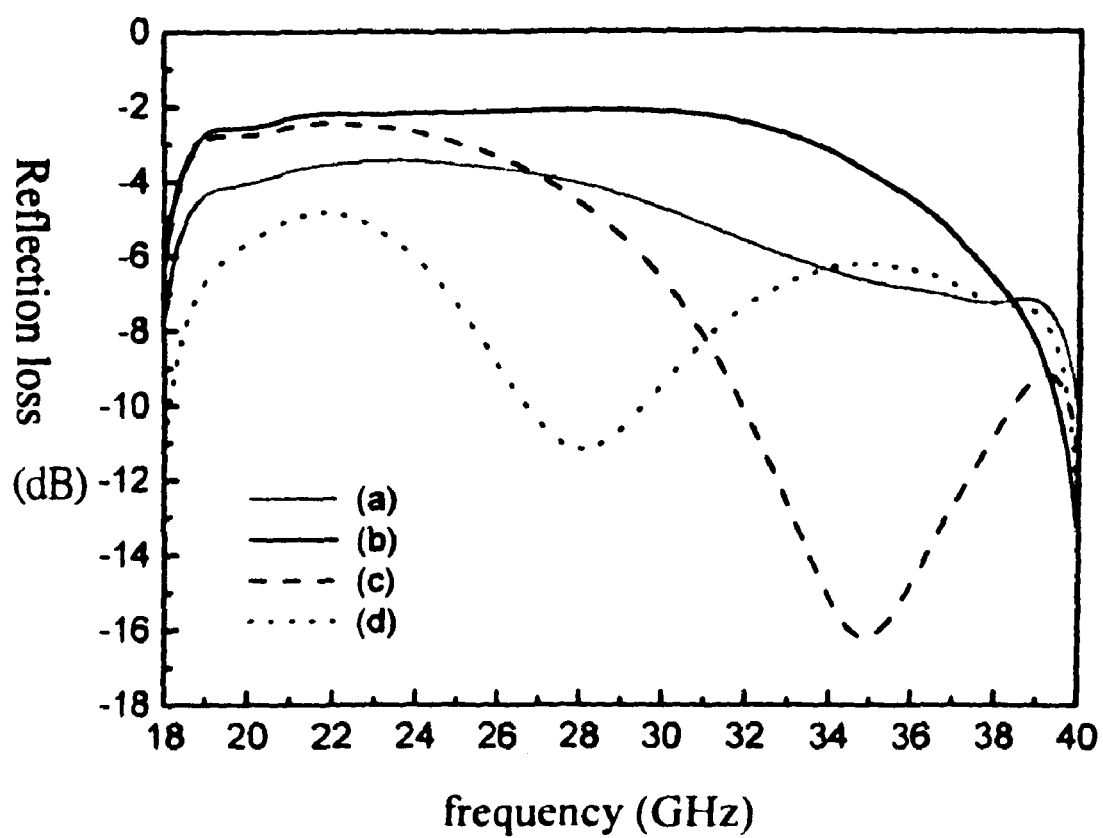
FIG. 10 is return loss of carbon black/epoxy nanocomposite material and epoxy composite material containing polyaniline/carbon black with various weight of carbon black with frequency from 18 to 40 GHz.

Refer to FIG. 10, return loss of nanocomposite material with frequency from 18 to 40 GHz is disclosed, curve (a) is epoxy/CB nanocomposite material, curve (b) is epoxy/PANI/CB(10) nanocomposite material, curve (c) is epoxy/PANI/CB(20) nanocomposite material, and curve (d) is epoxy/PANI/CB(30) nanocomposite material. The values of relative dB and the peak are in list 4. The return loss of epoxy/PANI/CB(30) nanocomposite material is −11.2 dB and the peak is at 28 GHz while when dB is −10, the linewidth is about 3 GHz (26.7-29.6 GHz). The return loss of epoxy/PANI/CB(20) nanocomposite material is −16.2 dB and the peak is at 35 GHz while when dB is −10, the linewidth is about 6.5 GHz (31.9-38.4 GHz). The peak of epoxy/PANI/CB(10) nanocomposite material is at 38 GHz but it's not obvious while the peak of epoxy/CB is at 38 GHz and the return loss is −7.2. The results show that within frequency ranging from 18 to 40 GHz, the epoxy/PANI/CB(20) has best absorption effect. In summary, the epoxy/PANI/CB(30) and epoxy/PANI/CB(20) nanocomposite materials achieve over 90% absorption no matter at low frequency range or high frequency range. Moreover, the absorption effect of them is better than that of the epoxy/CB nanocomposite material. Therefore, such nanocomposite materials have wide prospects of application and research values.

List 4 microwave absorption parameters at high frequency of epoxy composite material containing polyaniline/carbon black

|  | Epoxy nanocomposite material containing CB | Epoxy nanocomposite material containing PANI/CB(10) | Epoxy nanocomposite material containing PANI/CB(20) | Epoxy nanocomposite material containing PANI/CB(30) |
|---|---|---|---|---|
| peak frequency | 37.9 GHz | 38 GHz | 35.0 GHz | 28 GHz |
| maximum return loss | 7.2 dB | none | 16.2 dB | 11.2 dB |
| dB = −10 linewidth | none | none | 32~38.4 GHz | 26.7~29.6 GHz |

In summary, the epoxy composite material containing polyaniline/carbon black with more amount of nanoscale carbon black has higher conductivity. As to microwave absorption, the epoxy composite material containing polyaniline/carbon black has different return loss at higher frequency and at low frequency. The PANI/CB(30) and PANI/CB(20) have over 90% absorption no matter at higher frequency or at low frequency. This matches requirements for microwave absorbing material and such material is applied to microwave absorbing material.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A method for preparing an epoxy composite material containing polyaniline/carbon black composites comprising the steps of:
   adding aniline into nanoscale carbon black solution and then adding ammonium persulfate and acid into the mixture to produce the polyaniline/carbon black composites with a core-shell structure;
   adding a plurality of polyaniline/carbon black composites with core-shell structure into an epoxy resin; and
   distributing the plurality of polyaniline/carbon black composites with core-shell structure in the epoxy resin to produce the epoxy composite material containing polyaniline/carbon black composites, said polyaniline/carbon black composites with core-shell structure containing 20-30 wt. % of nanoscale carbon black and the weight ratio of said polyaniline/carbon black composites with core-shell structure to the epoxy resin is 3:7.

2. The method as claimed in claim 1, wherein the step of dispersing the plurality of polyaniline/carbon black composites with core-shell structure in the epoxy resin to produce the epoxy composite material containing polyaniline/carbon black further comprising a step of using a DC (direct current)-stirrer to disperse the plurality of polyaniline/carbon black composites with core-shell structure in the epoxy resin.

3. The method as claimed in claim 1, wherein in the step of dispersing the plurality of polyaniline/carbon black composites with core-shell structure in the epoxy resin to produce the epoxy composite material containing polyaniline/carbon black, the plurality of polyaniline/carbon black composites with core-shell structure are distributed evenly in the epoxy resin.

4. The method as claimed in claim 1, wherein the step of dispersing the plurality of polyaniline/carbon black composites with core-shell structure in the epoxy resin to produce the epoxy composite material containing polyaniline/carbon black further comprising a step of hot pressing.

5. The method as claimed in claim 1, wherein the nanoscale carbon black solution is produced by adding nanoscale carbon black into a dispersing agent and ethanol solution, then further adding acid into the mixture solution and processing the mixture by ultrasound vibration.

6. The method as claimed in claim 1, wherein the step of adding aniline into nanoscale carbon black solution and then adding ammonium persulfate and acid into the mixture to produce the polyaniline/carbon black composites with core-shell structure further comprising a step of vacuum filtration and acid rinsing.

7. The method as claimed in claim 6, wherein after the step of vacuum filtration and acid rinsing, a step of being heated for drying and grinded is further included.

* * * * *